F. G. MOODY.
Martingales.
No. 142,261. Patented August 26, 1873.
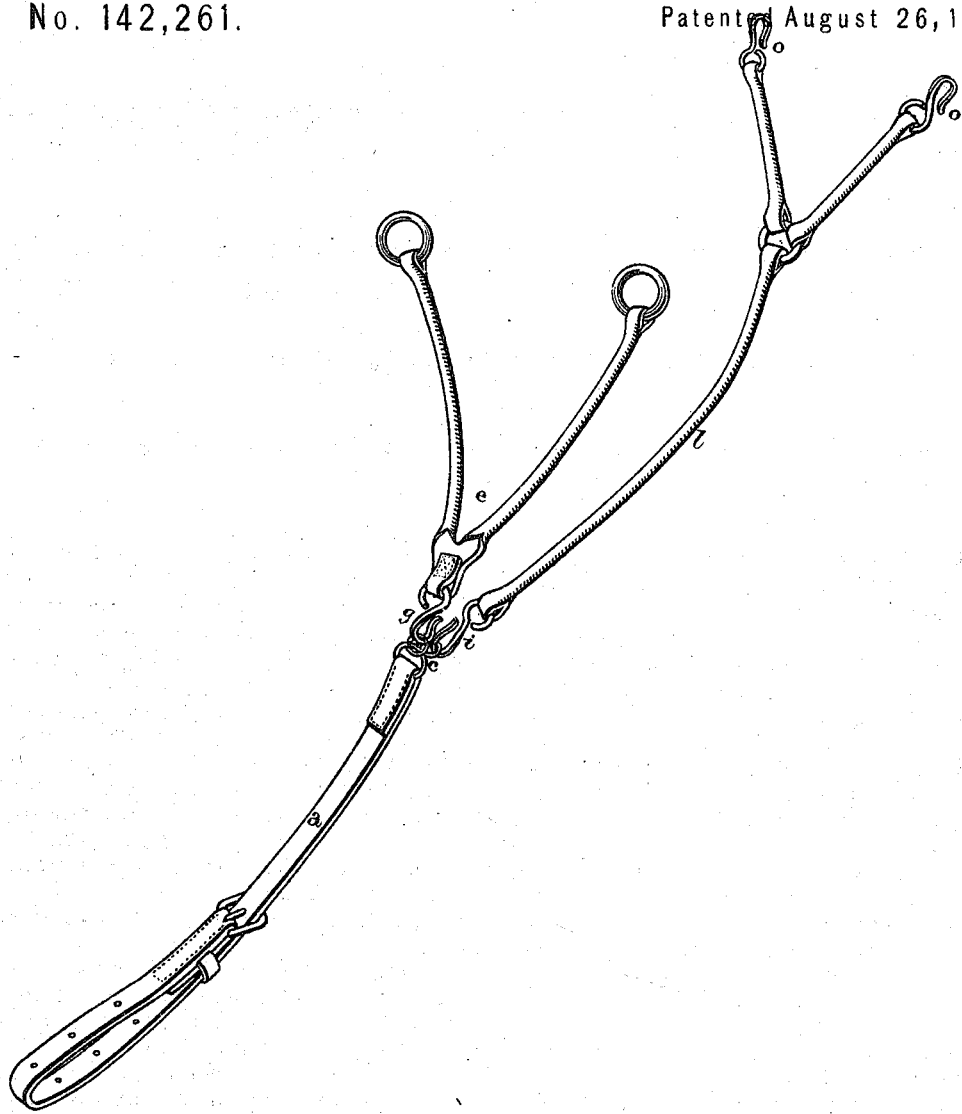
WITNESSES.
INVENTOR
F. G. Moody
per
F. A. Lehmann
By
Attorney.

UNITED STATES PATENT OFFICE.

FRANKLIN G. MOODY, OF NORTH MONMOUTH, MAINE, ASSIGNOR OF ONE-HALF HIS RIGHT TO GEORGE S. FAIRBANKS, OF SAME PLACE.

IMPROVEMENT IN MARTINGALES.

Specification forming part of Letters Patent No. 142,261, dated August 26, 1873; application filed July 31, 1873.

*To all whom it may concern:*

Be it known that I, FRANKLIN G. MOODY, of North Monmouth, in the county of Kennebec and State of Maine, have invented certain new and useful Improvements in Martingales; and I do hereby declare the following to be a full, clear, and exact description of the invention, such as will enable others skilled in the art to which it pertains to make and use it, reference being had to the accompanying drawings, which form part of this specification.

The nature of my invention relates to an improvement in martingales; and it consists in combining with a common martingale a second or auxiliary one, so as to prevent the horse from throwing up his head, as will be more fully described hereafter.

The accompanying drawing represents my invention.

$a$ represents the strap, which passes between the horse's front legs, and is held by the girth in the usual manner. To the front end of this strap is secured a double ring, or any other suitable holding device, $c$, in which is hooked a common martingale, $e$, by means of a hook or snap, $g$, so as to be readily detachable; but, if so preferred, the martingale and strap may be permanently attached, as usual, in which case only a single ring, $c$, or its equivalent, would be needed. Hooked into the second ring, by the hook $i$, is a second or auxiliary martingale, $l$, provided with hooks or snaps $o$ to fasten in the rings of the bit, and prevent the horse from throwing up his head.

By providing each of these martingales with hooks or snaps they are readily detachable, and can either be used both together or independently. Where the martingale has been made in the usual manner, by securing to it a ring or other holding device, in which the hook $i$ can catch, the two can be used together, as above described.

Having thus described my invention, I claim—

The combination of the martingale $e$ with martingale $l$, both attached to the strap $a$ by means of the ring $c$ and hooks or snaps $g$ $i$, substantially as shown and described.

In testimony that I claim the foregoing I have hereunto set my hand and seal this 1st day of July, 1873.

FRANKLIN G. MOODY. [L. S.]

Witnesses:
 JOHN H. POTTER,
 ERASTUS O. KELLY.